(12) United States Patent
Garcia Barace et al.

(10) Patent No.: US 9,523,349 B2
(45) Date of Patent: Dec. 20, 2016

(54) WIND TURBINE CONTROL METHOD

(71) Applicant: ACCIONA WINDPOWER, S.A., Sarriguren (Navarra) (ES)

(72) Inventors: Alberto Garcia Barace, Sarriguren (ES); Oscar Luquin Hermoso De Mendoza, Sarriguren (ES); Igor Egana Santamarina, Sarriguren (ES); Teresa Arlaban Gabeiras, Sarriguren (ES); Stephen Tonks, Sarriguren (ES); Jose Miguel Garcia Sayes, Sarriguren (ES); Miguel Nunez Polo, Sarriguren (ES)

(73) Assignee: Acciona Windpower, S.A., Sarriguren, Nararra (ES)

( * ) Notice: Subject to any disclaimer, the term of this patent is extended or adjusted under 35 U.S.C. 154(b) by 718 days.

(21) Appl. No.: 13/938,343

(22) Filed: Jul. 10, 2013

(65) Prior Publication Data

US 2014/0028024 A1 Jan. 30, 2014

(30) Foreign Application Priority Data

Jul. 11, 2012 (ES) .................................. 201231088

(51) Int. Cl.
*F03D 7/00* (2006.01)
*F03D 1/06* (2006.01)

(52) U.S. Cl.
CPC .............. *F03D 7/00* (2013.01); *F03D 1/0641* (2013.01); *F03D 17/00* (2016.05); *F03D 80/40* (2016.05); *Y02E 10/721* (2013.01); *Y02E 10/722* (2013.01); *Y02E 10/723* (2013.01)

(58) Field of Classification Search
CPC .... F03D 7/00; F03D 11/0025; F03D 11/0091; F03D 1/0641
See application file for complete search history.

(56) References Cited

U.S. PATENT DOCUMENTS

| | | | | |
|---|---|---|---|---|
| 5,289,041 A | * | 2/1994 | Holley | F03D 7/0224 290/44 |
| 7,086,834 B2 | | 8/2006 | LeMieux | |
| 8,096,761 B2 | * | 1/2012 | Fric | F03D 7/0224 416/1 |
| 8,096,762 B2 | * | 1/2012 | Risager | F03D 7/0224 416/1 |
| 2005/0276696 A1 | * | 12/2005 | LeMieux | F03D 7/02 416/61 |
| 2009/0021015 A1 | * | 1/2009 | Pedersen | F03D 7/0292 290/44 |
| 2010/0098540 A1 | * | 4/2010 | Fric | F03D 7/0224 416/36 |
| 2011/0042950 A1 | | 2/2011 | Mizoue et al. | |
| 2011/0133563 A1 | * | 6/2011 | Barton | H02J 3/386 307/84 |
| 2011/0176928 A1 | * | 7/2011 | Jensen | F03D 1/0675 416/233 |

FOREIGN PATENT DOCUMENTS

ES 2293269 3/2008

* cited by examiner

*Primary Examiner* — Igor Kershteyn
*Assistant Examiner* — Eldon Brockman
(74) *Attorney, Agent, or Firm* — McNees Wallace & Nurick LLC

(57) ABSTRACT

A wind turbine control method is described comprising the detection of the presence of an anomaly in the aerodynamic profile of the blades and operation of the wind turbine in accordance not only with the determination of said anomaly, but also taking into account the characteristics thereof.

10 Claims, 6 Drawing Sheets

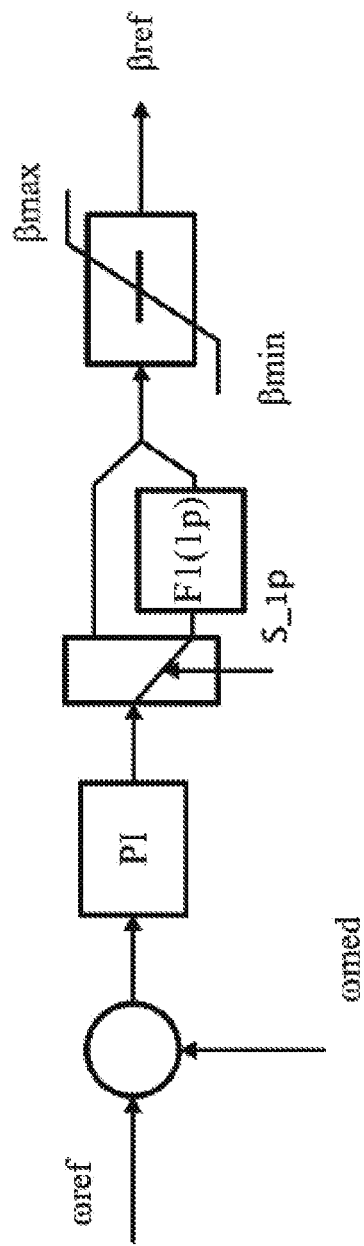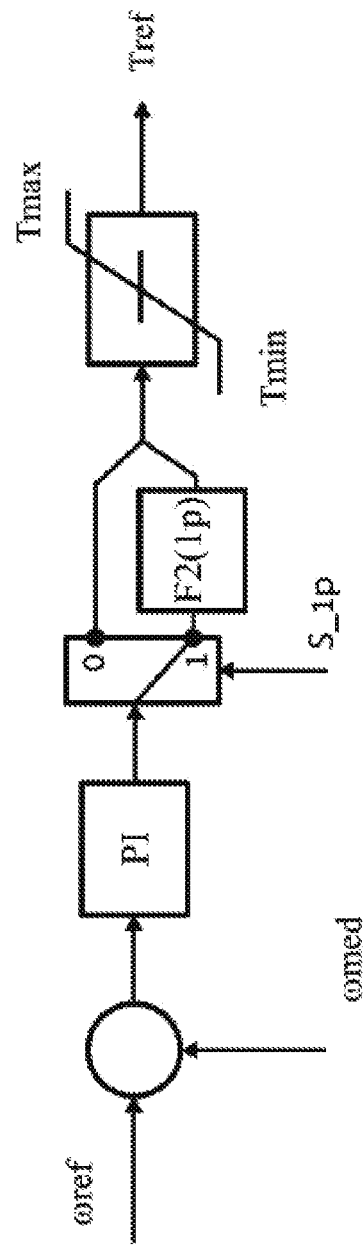
*FIG. 2a*
*FIG. 2b*

WIND TURBINE CONTROL METHOD

OBJECT OF THE INVENTION

The present invention falls within the field of electricity generation through the transformation of wind energy.

The object of the invention consists of a wind turbine control method that takes into consideration the blade profiles aerodynamic condition for modifying at least one control parameter in order to increase the availability of the wind turbine.

BACKGROUND OF THE INVENTION

The deposition of ice or other type of undesired material on the wind turbine blades hampers the proper functioning thereof and entails, among other consequences, modification of the geometry of the aerodynamic blade profile and poor distribution of loads and stresses on both on the rotor and other wind turbine components. Said problem is well known and there are multiple solutions in the state of the art for detecting, determining or monitoring changes in the aerodynamic profile of the blades or for directly detecting the formation of ice.

Solutions aimed at solving said problem, such as that disclosed in U.S. Pat. No. 7,086,834B2, which describes the manner in which ice is detected on the blades of a wind turbine, are known to exist in the state of art.

Likewise, US2011042950 (A1), which details a system for quantifying the quantity of ice formed on the blades and that will continue functioning if the quantity of ice deposited is smaller than a certain predetermined quantity; if this quantity is exceeded, the wind turbine switches to a non-load operating mode wherein the ice on the blades continues to be quantified.

ES2293269T3 discloses a method for detecting ice on a wind turbine, wherein the operating mode of the wind turbine is modified if certain values are determined by means of sensors, the result of which is compared to predefined operating parameter values of the wind energy facility; if the comparison determines a previously estimated difference value, the operating mode is modified.

U.S. Pat. No. 8,096,761B2 discloses a method for managing a wind turbine which details a method for determining the minimum blade pitch value in accordance with the blade efficiency value calculated based on wind speed and rotor speed and for maintaining the blade pitch angle at a value greater than or equal to the minimum blade pitch value determined in response to the blade efficiency parameter, regardless of the programmed operating parameters.

None of said documents provides a valid solution to the problem of increasing wind turbine availability in situations where a certain degree of variation in the aerodynamic profile of the blades is determined.

DESCRIPTION OF THE INVENTION

In light of the problem raised, a valid solution is provided to the problem of increasing wind turbine availability, adapting, to this end, the control to the type of aerodynamic and mass condition to increase energy production. Said solution is materialised in the method object of the invention, which provides a procedure for controlling the wind turbine in situations in which there is a variation in the aerodynamic profile of the blades. Said control procedure comprises two main phases or stages:

A first phase involving the detection and diagnosis of the variation in the geometry of the profiles (discriminating whether this variation is balanced between the blades, normally three blades).

A second phase, based on the previously determined variation, in which the wind turbine control parameters are modified.

As indicated in the preceding paragraph, the wind turbine control method disclosed herein starts with determining variations in the aerodynamic profile of at least one of the blades. Said determination is based on the obtainment, by means of a series of sensors, of at least one parameter representative of wind turbine operating status and the calculation of a first signal sensitive to unbalanced variations of the aerodynamic profile between the blades, by applying a calculation of harmonic 1p to the rotation frequency of the rotor based on at least the one parameter representative of wind turbine operating status. Said parameter representative of wind turbine operating status can be wind turbine speed and/or torque ad/or loads, or the measurement of an electrical variable such as power generated. Said data are captured by the sensors with a determined sampling frequency of at least ten times greater than the rotation frequency of the rotor.

Said first signal obtainable from the captured data, regardless of the data capture system used, is sensitive to unbalanced variations in the aerodynamic profile between the blades, i.e., any unbalanced variation influences said first signal and, likewise, any second or third signal calculated or determined on the basis of at least one parameter captured by the sensors, in such a manner that the presence of unbalanced variations directly affects the value or shape of said first signal.

In order to determine the existence or non-existence of unbalanced variation between all the wind turbine blades, a comparison is made between the first signal and a first threshold value that will determine a possible amplification of said harmonic 1p at the rotation frequency of the rotor at a given time.

If it is determined that the variation is unbalanced, given that the comparison between the first signal calculated and the first threshold value reveals that the first signal exceeds said first threshold, at least one torque control loop is modified. The fact that the first signal exceeds the first threshold indicates an increase in the harmonic 1p (resulting from the calculation applied to the data captured by the sensors) greater than the value of the harmonic 1p predetermined as the first threshold value.

Said modification in the torque control loop involves including a first filter at a frequency of 1p at the torque control loop regulator output, although said modification can also include altering the blade pitch control loop by including a second filter at the corresponding frequency of 1p in the event that an unbalanced variation in the aerodynamic profile of the blades is determined.

It should be noted that the method disclosed herein takes into consideration the fact that non-detection of the existence of unbalanced variation does not imply the non-existence of unbalanced variation (i.e. an aerodynamic and/or mass variation of the blade profiles approximately equal in all the blades). It can exist and generates a series of loads that are harmful to the wind turbine rotor; therefore, an additional step is envisaged in the control method to determine said circumstance which may require data not comprised in the first signal. To this end, it may be necessary to determine a balanced variation with respect to a normal operating state, for which a comparison is made of a second signal related to the current pitch with a fourth threshold value corresponding to a blade pitch value greater than that of a blade entering a stall condition.

In order to increase wind turbine availability in this event, the step of temporarily modifying the minimum blade pitch angle in the pitch control loop to equate it to a value greater than or equal to the value of the fourth threshold is included. The fourth threshold may be a constant and predetermined value or it may be wind speed-dependent.

In an alternative embodiment of the object of the invention an additional comparison may or may not be made between the signal and a third threshold value, where said third threshold value is greater than the first threshold value and is a value corresponding to a value as of which the wind generator is disconnected. Additionally, a comparison can be made between the second signal and a fifth threshold value in order to disconnect the wind turbine.

In any of the possible embodiments in which different thresholds, parameters and values are used, wind turbine availability and, therefore, the energy produced by it, is increased by adapting the control in accordance with the detection of anomalies in the rotor thereof.

DESCRIPTION OF THE DRAWINGS

In order to complement the description being made and with the object of helping to better understand the characteristics of the invention, in accordance with a preferred embodiment thereof, said description is accompanied, as an integral part thereof, by a set of drawings where, in an illustrative and non-limiting manner, the following has been represented:

FIG. 2a shows a diagram of the pitch control loop according to the invention.

FIG. 2b shows a diagram of the torque control loop of the method object of the invention.

PREFERRED EMBODIMENT OF THE INVENTION

In light of the figures, following is a preferred embodiment of the object of this invention.

Figure 2C:
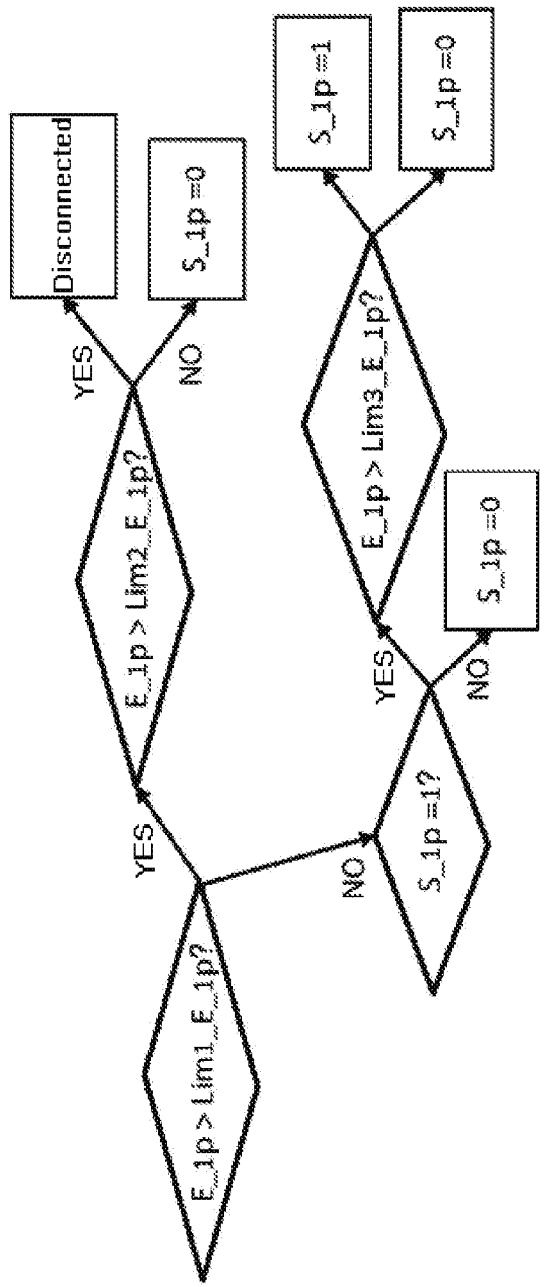
FIG. 2c shows a flowchart representing the sequence that determines the activation of the first and/or second filter in the torque and pitch control loops.

The present idea enables the wind turbine to continue functioning in situations in which the rotor has an aerodynamic or mass anomaly by using the method described herein and illustrated in FIG. 2c:

A first phase involving the detection and diagnosis of the variation of the physical properties of the blades with respect to the design properties (discriminating whether this variation is balanced between the blades, normally three blades).

A second phase, based on the variation previously determined, in which the wind turbine control parameters are modified.

A type of variation in the physical properties of the blades currently known is the aerodynamic and/or mass variation associated with the deposition of ice or dirt on the blades, the effect of which, among others, is the modification of the curves Cp (λ, β) that define the power coefficients of the blades for each working point (λ is defined as the coefficient between the linear speed of the tip of the blade and wind speed and β corresponds to the blade pitch angle).

Figure 1:
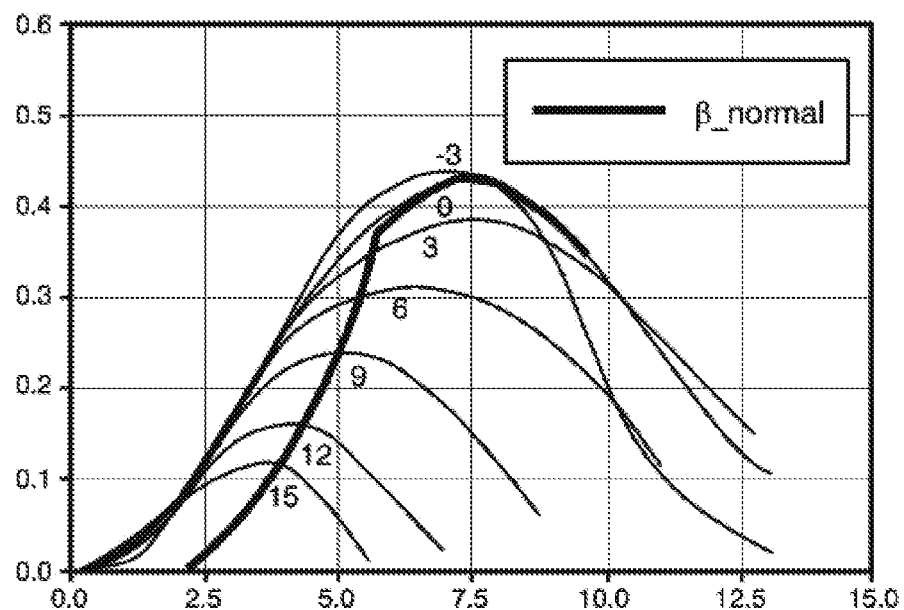
FIG. 1 shows a graph representing the power curves based on λ and β and pitch angle evolution during normal operation.

FIG. 1 shows the typical power curves of a wind turbine for different blade pitch angles, which determine the power captured by the wind turbine rotor depending on rotation speed and the area swept, as indicated in the formula below:

$$P = \frac{1}{2} \cdot C_P(\lambda, \Omega, \beta) \cdot A \cdot V^3 \cdot e$$

Said FIG. 1 also shows a static curve that follows the blade pitch angle commanded by the wind turbine controller during normal operation according to the state of the art: in general, the position of 0° is selected to function near maximum Cp in the variable wind turbine speed zone; once nominal power is reached, the controller increases the blade pitch angle setpoint in order to control the rotation speed of the rotor at approximately the nominal rotation speed (ωref). The curves Cp (λ, β) are very sensitive to changes in profile shape, which occur when there is ice or dirt on the blades. Ice can be deposited on the blades in a balanced manner, i.e. in the same manner and quantity on all the blades when the wind turbine is rotating, or in an unbalanced manner, i.e. in a different manner and quantity between at least two wind turbine blades, which usually occurs when the wind turbine is stopped or when ice falls off one of the blades.

An unbalanced (or non-balanced) modification of the shape or mass of the blade profiles causes the appearance of harmonic 1p values (at rotor rotation frequency) in certain data representative of wind turbine status, such as wind turbine rotor rotation speed, torque and loads which are greater than the values obtained during operation without rotor imbalance. This can be harmful to the wind turbine as it worsens the fatigue performance thereof, due to which once a certain level of energy in the harmonic 1p is exceeded, i.e. once an imbalance in the blades is detected, a controller according to the state of the art will stop the wind turbine, causing non-availability thereof and a decrease in the energy produced.

Alternatively to the detection of an energy 1p value greater than a threshold value, an optical inspection could be carried out by means of sensors that capture the shape of the blade profiles for detecting rotor imbalance.

Figure 3:
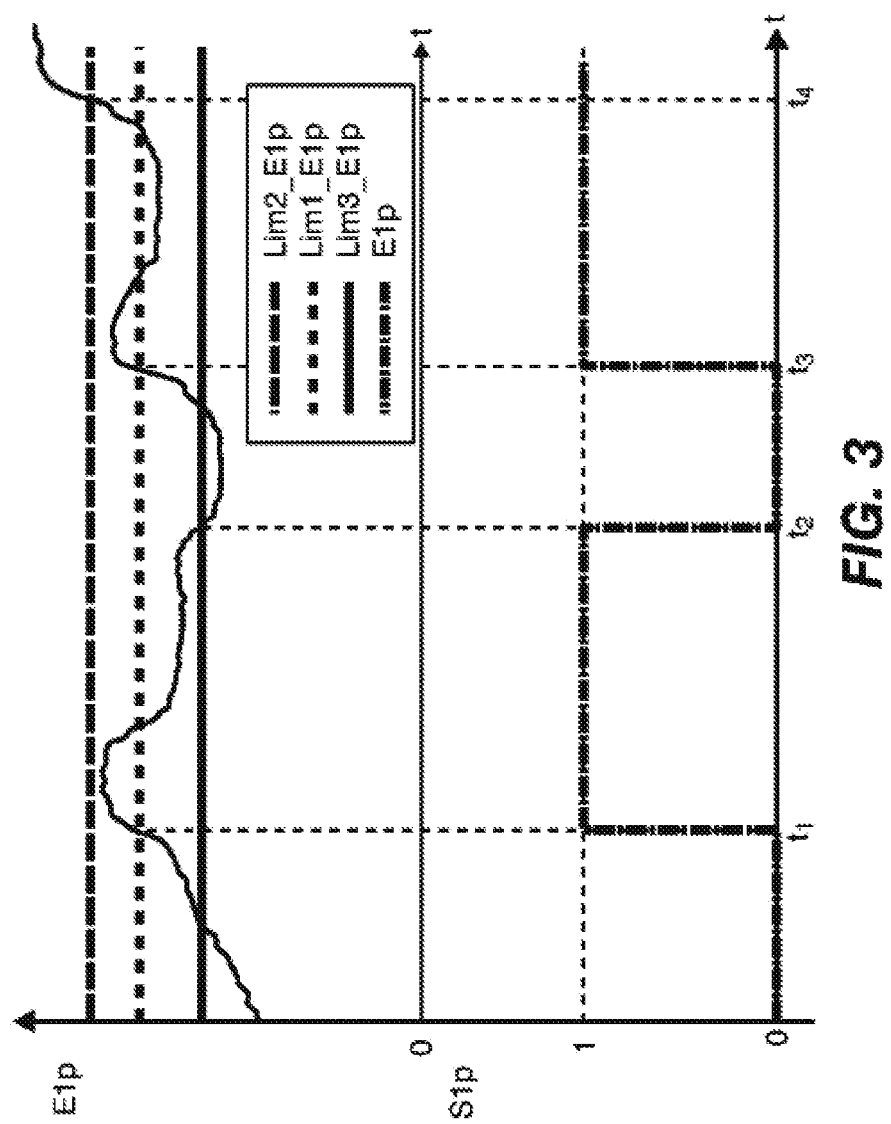
FIG. 3 shows a graph representing the evolution of E1p and S1p.
Figure 4:
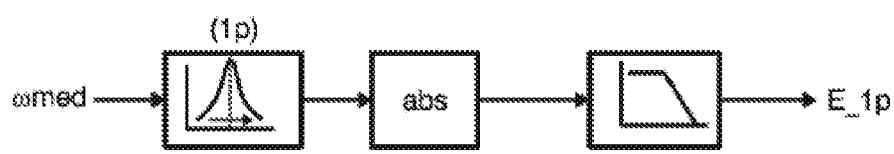
FIG. 4 shows a block diagram representing the E1p calculation process (energy 1p).

In order to discriminate the existence of an unbalanced variation in the geometry of the wind turbine blade profiles and limit the non-availability of the wind turbine, according to the method proposed in the present invention, the following steps are carried out, as shown in FIGS. 2c, 3 and 4:

At least one parameter representative of wind turbine operating status, which can be, for example, turbine rotation speed (ωmed) is determined by means of a series of sensors, although it may also be a parameter relating to torque, wind turbine loads or any electrical variable.

A first signal indicative of an unbalanced variation in the aerodynamic profile of the blades is calculated, for example, a signal indicative of the energy of the harmonic 1p obtained from said parameter relating to wind turbine operation.

The sign indicative of the energy of the harmonic 1p is compared to a first threshold value (Lim1_E1p), which in a preferred embodiment will be lower than the threshold value for which the wind turbine was designed.

If the sign indicative of the energy of the harmonic 1p is greater than the first threshold value (Lim1_E1p), the torque controller and/or pitch controller is modified, switching the signal from the corresponding controller for passage thereof through a filter at a frequency of 1p, i.e. activating a first and/or second filter (F2(1p), F1(1p)) at a frequency of 1p, which prevents the torque and pitch controllers from working at that frequency (S1p=1). This prevents the control actions from amplifying the level of vibrations and loads at that frequency (indicated by the energy level 1p) and the sign indicative of energy 1p falls below critical values.

Additionally, in an embodiment of the object of the invention, the first signal indicative of the harmonic 1p (E1p) is compared to a second threshold value (Lim2_E1p) greater than the first threshold value (Lim1_E1p), above which the wind generator is disconnected.

In order to prevent the pitch control loop such as that shown in FIG. 2a or the torque control loop shown in FIG. 2b from switching constantly between the branch wherein a filter is applied and the branch wherein a filter is not applied, i.e. to prevent the first filter F2(1p) from becoming constantly activated and deactivated, the signal indicative of the harmonic 1p (E1p) is compared to a third threshold value (Lim3_E1p) lower than the first threshold value (Lim1_E1p) and when the signal indicative of the harmonic 1p (E1p) returns to values lower than the third threshold value, the signal from the controller switches again to prevent it from passing through the filter at a frequency of 1p (S1p=0).

If these filters (F1(1p) and F2(1P)) were to become activated during normal operation, the dynamic characteristics of the controllers would be modified and would no longer be optimal for wind turbine control. However, as they only become activated when an unbalanced anomaly is detected in the rotor (when the energy 1p level is greater than the first threshold value), the controllers do not lose their effectiveness during normal operation and are not activated, amplifying the load level at a frequency of 1p.

Figure 5:
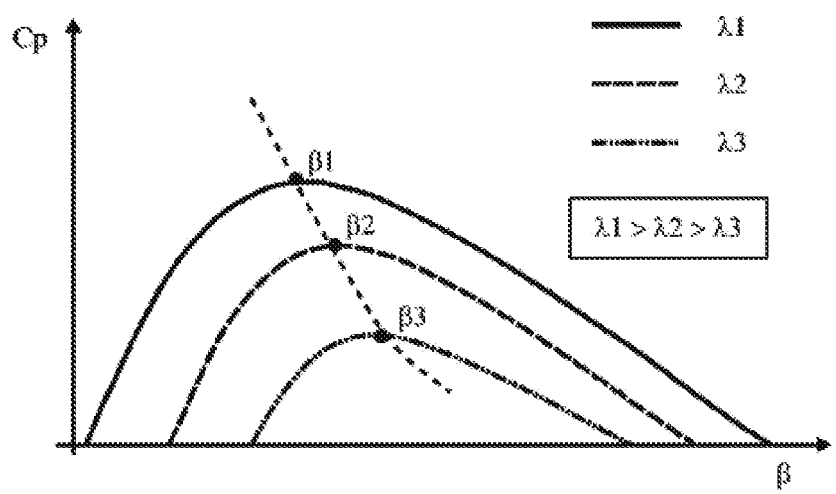
FIG. 5 shows a graph representing the evolution of the pitch control parameters in accordance with the wind, where the aerodynamic stall zone and normal operation zone can be observed on either side of the dashed line.
Figure 6:
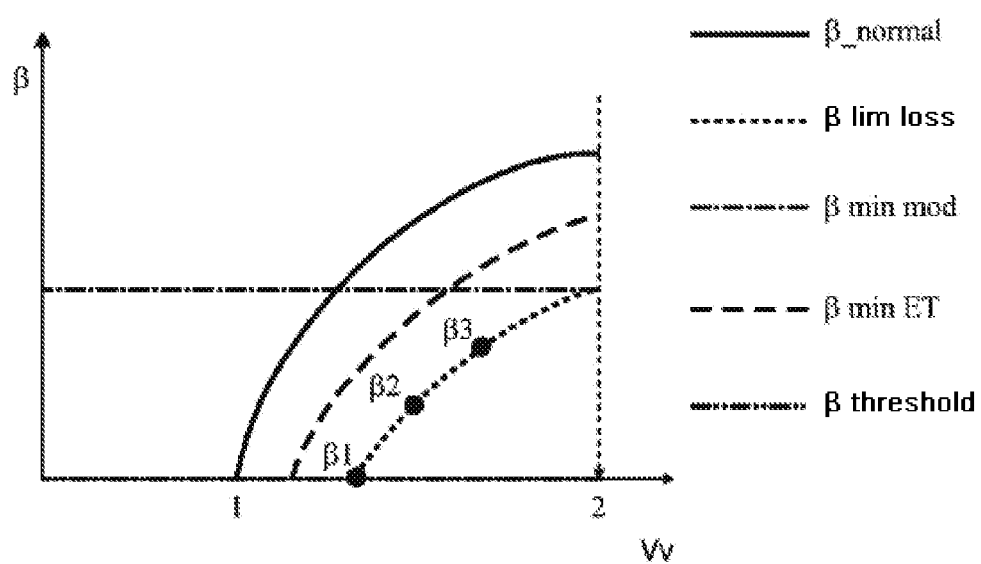
FIG. 6 shows a graph representing the evolution of the pitch control parameters in accordance with the wind, where the central curve represents the evolution of the threshold values.

The balanced modification of the aerodynamics of the blade profiles and, therefore, of the curves Cp ($\lambda$, $\beta$), can cause the blade to enter a stall condition (delimited by the curve defined by the dashed line that crosses points ($\beta 1$, $\beta 2$, $\beta 3$) of FIG. 5 and the central curve of FIG. 6), wherein an increase in wind speed implies a reduction in captured power.

In this situation, a wind turbine control according to the state of the art would tend to move towards smaller angles of attack in order to increase power to the nominal zone, which increases the loads in the blade In this situation, the blades enter an aerodynamic zone not envisaged in a control according to the state of the art and are more exposed to the wind, in such a manner that in the event of ice falling off or gusts of wind, it can give rise to high loads that could damage wind turbine components such as the blades or hub.

Therefore, the control method proposed comprises the step of comparing a second signal to a fourth threshold value, where said second signal is a current blade pitch signal and said fourth threshold value ($\beta$_threshold) is a blade pitch value greater than that of blade pitch entering a stall condition ($\beta$_lim_loss), to determine balanced variations in the aerodynamic profile of at least one wind turbine blade.

To this end, in a preferred embodiment the following steps are carried out:

A signal indicative of wind speed is taken (which will normally be a filtered signal of the measurement made by the anemometer).

The blade pitch angle measurement is compared to a certain blade pitch threshold ($\beta$_threshold) which corresponds to a blade pitch value greater than or equal to that of a blade entering a stall condition at the wind speed indicated by the signal indicative of wind (alternatively, a comparison can be made between the power generated and that corresponding to that level of wind). Preferably, the threshold pitch value is greater than that on entering a stall condition ($\beta$_lim_loss) and lower than the value during normal operation ($\beta$_normal).

If the blade pitch measurement is lower than the threshold value, the pitch controller is modified, establishing a new minimum pitch value $\beta$_min_mod. Preferably, the modified minimum pitch value $\beta$_min_mod is greater than the threshold stall pitch value $\beta$_lim_loss (in the state of the art, the minimum threshold pitch $\beta$min_ET is predetermined and independent of wind speed; generally equal to zero or the angle of maximum production).

The technical effect of this characteristic of the control method proposed when the anomaly existing in the blades is balanced is to prevent the pitch angle from being very small (approximately equal to zero or the angle of maximum production) as a consequence of the modification of the aerodynamic characteristics of the blades that cause the profiles to enter a stall condition. When this occurs, a controller according to the state of the art will tend to decrease the blade pitch angle to attempt to correct the power loss associated with aerodynamic loss, even if wind speed increases. This leads to an increase in wind turbine loads. To avoid this, a controller according to the state of the art, upon detecting the anomaly in the blades, disconnects the wind turbine, causing a reduction in the availability of the machine and in the energy produced.

The invention claimed is:

1. A method for controlling a wind turbine that comprises a rotor which in turn comprises a series of blades, said method comprising the following steps:
   determining, by a series of sensors, at least one parameter representative of the wind turbine operating status;
   calculating a first signal sensitive to unbalanced variations in the aerodynamic profile between the blades based on the at least one parameter representative of the wind turbine operating status;
   comparing said first signal to a first threshold value;
   determining the existence of an unbalanced variation in the aerodynamic profile between the blades when the first signal exceeds the first threshold value; and
   modifying at least one torque control loop that sets the torque of the rotor when the existence of an unbalanced variation in the aerodynamic profile of the blades is determined in the former step increasing the availability of the wind turbine, wherein modifying at least one torque control loop comprises activating a first frequency filter that suppresses a rotation frequency of the rotor in the torque control loop.

2. The method of claim 1, wherein the first signal is a result of the calculation of a harmonic at the rotation frequency of the rotor obtained from said one parameter representative of the wind turbine operating status which is selected from: rotor speed, rotor torque, loads in the blades and electrical variables previously determined by the series of sensors.

3. The method of claim 1, further comprising modifying a blade pitch control loop by including a second frequency filter that suppress a rotation frequency of the rotor in the aforementioned blade pitch control loop.

4. The method of claim 1, further comprising comparing the first signal to a second threshold value, where said second threshold value is a value as of which the wind turbine is disconnected, said second threshold value being greater than the first threshold value.

5. The method of either claim 1 or 4, further comprising comparing the first signal to a third threshold value, where said third threshold value is a value smaller than the first threshold value, and deactivating the first frequency filter that suppress a rotation frequency of the rotor in the torque control loop if the first signal is less than the third threshold value and the first frequency filter is activated.

6. The method of claim 1, further comprising the step of comparing a second signal with a fourth threshold value, where said second signal is a current blade pitch signal and said fourth threshold value is a blade pitch value greater than that of a blade entering a stall condition.

7. The method of claim 6, further comprising modifying a blade control pitch loop when the value of the second signal is lower than the value of the fourth threshold value, by temporarily modifying the minimum blade pitch angle threshold and equating it to a value greater than or equal to that of the fourth threshold value.

8. The method of claim 6, wherein the fourth threshold value is constant and predetermined.

9. The method of claim 6, wherein the fourth threshold value is dependent on wind speed.

10. The method of claim 6, wherein further comprising the step of comparing the second signal to a fifth threshold value, where:
- the fifth threshold value is a value at which the wind generator is disconnected, and
- the fifth threshold value is greater than the fourth threshold value.

\* \* \* \* \*